H. L. DOOLEY.
SEED SEPARATING MECHANISM FOR PLANTERS.
APPLICATION FILED MAY 11, 1910. RENEWED JULY 23, 1915.

1,174,130.  Patented Mar. 7, 1916.

Witnesses
B. F. Brann
S. Jay Teller

Inventor
H. L. Dooley,
By Otto F. Bliss
Attorney

THE COLUMBIA PLANOGRAPH CO., WASHINGTON, D. C.

---

UNITED STATES PATENT OFFICE.

HARRY L. DOOLEY, OF ROCK ISLAND, ILLINOIS.

SEED-SEPARATING MECHANISM FOR PLANTERS.

1,174,130.            Specification of Letters Patent.       Patented Mar. 7, 1916.

Application filed May 11, 1910, Serial No. 560,641. Renewed July 23, 1915. Serial No. 41,621.

*To all whom it may concern:*

Be it known that I, HARRY L. DOOLEY, citizen of the United States, residing at Rock Island, in the county of Rock Island and State of Illinois, have invented certain new and useful Improvements in Seed-Separating Mechanisms for Planters, of which the following is a specification, reference being had therein to the accompanying drawing.

This invention relates to improvements in seed planters.

It is particularly adapted for use in corn planters of the check-row type but it will be understood that it is also applicable to other forms of planters.

The invention has to do particularly with the seed separating mechanism and has for its object to provide a mechanism which is of simple construction and which is reliable in its operation.

The construction is similar in some respects to that disclosed in my co-pending application entitled Seed separating mechanism for planters, filed March 24, 1910, Serial Number 551,231. I do not, therefore, herein claim any of the improvements disclosed in the said application.

Figure 1:
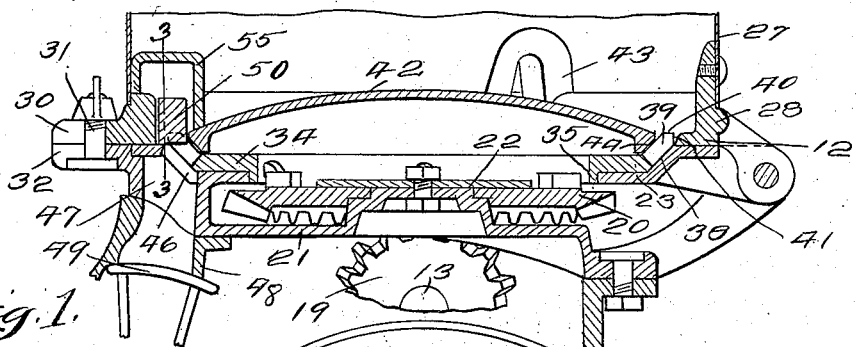
Figure 2:
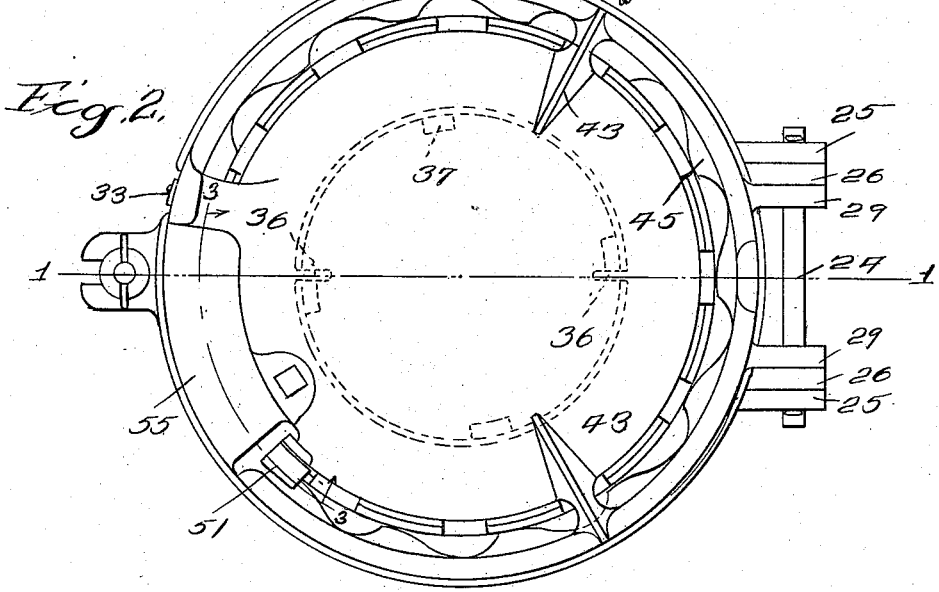
Figure 4:
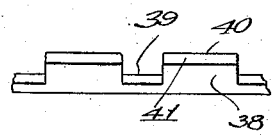
Figure 3:
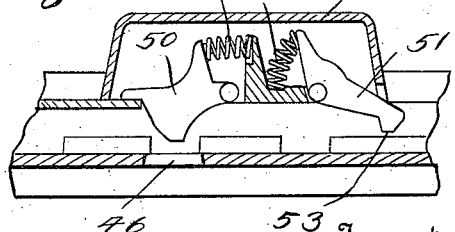

In the accompanying drawings, showing one embodiment of my invention Figure 1 is a fragmentary sectional elevation through one of the seed separating mechanisms the view being taken along the line 1—1 of Fig. 2. Fig. 2 is a plan view of one of the seed separating mechanisms. Fig. 3 is a fragmentary cross-sectional view taken on the lines 3—3 of Figs. 1 and 2. Fig. 4 is a fragmentary edge view of the seed plate.

The seed separating mechanism embodying my invention is, as before stated, especially adapted for use on planters of the check-row type which are provided with intermittently actuated transverse operating shafts. The construction and operation of the planters of this type are well known and I have, therefore, shown in the drawing only the seed separating mechanism itself and the parts immediately associated therewith.

13 represents the operating shaft of a planter and is provided at its end with a bevel pinion 19 in mesh with a bevel gear 20 rotatably mounted upon the supporting casing 21. The casing 21 is suitably mounted upon the forward part of the planter frame. The gear 20 is held in place on the casing by means of a retaining plate 22.

23 represents a casting forming the hopper bottom. The casting 23 is pivotally connected with the casting 21 by means of a pivot pin 24 which passes through suitable ears 25 and 26 formed on the two castings.

27 represents the hopper proper, which may be formed of sheet metal. Connected with the lower part of the sheet metal hopper 27 is a base ring 28 which is also pivotally mounted on the pin 24 by means of ears 29 and which is adapted to closely engage with the upper surface of the casting 23. The ring 28 is provided with a slotted lug or ear 30, and a bolt 31 may be passed through the ear 30 and a corresponding ear 32 on the casting 21 to secure the hopper in position. A spring catch such as is indicated by 33 is provided to secure the casting 23 to the hopper, so that when the hopper is swung backward the casting 21 and adjacent parts may move with it.

34 represents the seed plate or seed ring which is formed with a large central opening and with a depending annular flange 35 which is adapted to engage with the edges of an opening formed in the upper surface of the casting 23. The upper surface of the gear 20 is provided with teeth such as indicated by 36. The teeth are preferably two in number. The seed plate or ring 34 is provided with radially extending lugs 37, preferably four in number. These lugs 37 are adapted to be engaged by the teeth 36 on the gear, and by means of these lugs and teeth the seed plate is rotated.

It will be noted that the hopper bottom casting 23 is provided with a large central circular depression having annular beveled edges 38 lying at an angle of about forty-five degrees. The main part of the seed plate 34 lies in this depression in the hopper bottom. The edges of the seed plate, however, are provided with teeth 39 which are evenly spaced about its periphery and which extend radially outward and diagonally upward parallel to the beveled edge 38 of the depression in the hopper bottom. Each tooth 39 is provided with an upper inclined surface parallel to the surface 38, an upper horizontal surface 40, and an outer vertical surface 41. It is to be noted that the surfaces 40 and 41 lie above the upper surface of the hopper bottom 23. The teeth 39 are so arranged that the spaces between them are each adapted for the reception of a single kernel of corn lying edgewise with its length extending along the circumference of the plate.

42 is a crowned cover or cap plate for the seed plate 34. This cap plate 42 is preferably cast integral with the ring 28 and is connected with it by means of the lugs or carriers 43. The plate 42 is provided at its edge with a beveled surface 44 which is adapted to form the upper sides of the seed cells between the teeth 39.

45 represents a series of teeth or seed guides mounted on the hopper bottom 23 between the ring 28 and the outer circumference of the seed plate teeth 39. These teeth 45 are provided with rounded beveled edges and are shaped to act as guides and coöperate with the upstanding ends of the teeth 39 to direct seeds into the seed cells.

At its rear side the hopper bottom or seed plate supporting casting 23 is provided with a discharge opening 46, and the casting 21 below it has a registering opening 47 which connects with the seed plate boot 48 through which the seeds pass to the dropping mechanism indicated in part by 49. Above and to one side of the opening 46 are mounted the knock-out 50 and the cut-off 51. The knock-out 50 is in the form of a pivoted dog adapted to ride over the upper faces of the seed plate teeth and to be forced down between the said teeth by a coiled spring 52 as the seed plate moves, one seed cell after another, underneath the knock-out. The cut-off 51 is also in the form of a pivoted dog. The free end of the cut-off has a horizontal lower edge 53 which at one end rests upon an extended part of the hopper bottom and closely overlies the upper horizontal faces 40 of the seed plate teeth 39. In this position the cut-off is held yieldingly by a coiled spring 54.

55 is a housing which incloses the knock-out and the greater part of the cut-off.

In operation the hopper 27 is filled with corn and the seed plate 34 is intermittently rotated by means of the gearing and connections which have been described. The greater part of the weight of the corn is sustained by the plate 42. At the edges of the plate 42 the corn is agitated by the upper ends of the moving teeth 39. The teeth 39 tend to move the kernels of corn circumferentially of the hopper and the guides 45 engage the kernels and tend to force them toward the center of the hopper and into the inclined cells between the teeth 39. After a cell has received a kernel of corn in the proper edgewise position, the kernel is carried to the opening 46 where it is discharged by the knock-out 50. The cut-off 51 serves to prevent more than one kernel passing to the knock-out in a single cell. The open sides of the upper part of the cells in alinement with the surfaces 41 permit the ready removal by the cut-off of any additional kernel which may have partly entered a cell which has already properly received one kernel. It is also to be noted that by reason of the inclination of the cell walls relative to the edge or face of the cut-off the seeds or kernels of comparatively widely varying widths are accurately separate and individually discharged, for it is clear that with two kernels, lying on their sides at an angle of 45°, or indeed at any angle less than 90°, and of different widths, the difference in the clearance between the upper edges of said kernels and the horiontzal working edge of the cut off is less than the difference in the actual width of the kernels. In other words, a relatively small clearance between the cut off and the upper edge of the narrowest seed that will be individually separated and discharged with unfailing accuracy, permits such an accurate separation and discharge of a much wider seed or kernel, than would be possible if the walls of the seed cell and the edge of the cut off were at right angles to each other. This wide variability in width of seed that can be accurately separated, combined with the longitudinal (circumferential) adjustment of the seed cell, gives my improved seed plate mechanism a very wide range in its adaptability to the planting of seeds of varying kinds and sizes, for it is well understood that it is the width and length of the corn seed or kernel that are subject to the greatest variation, the variation of the third dimension *i, e.* the thickness of the kernel, being relatively very small. It is clear that my improved seed plate with the inclined cells takes advantage of this characteristic of the corn seed.

What I claim is:—

1. In a planter, a seed separating mechanism comprising a hopper base, and a rotary seed plate having a circumferential series of radially outward and diagonally upward extending teeth, the outer surface of the plate between the said teeth, the outer circumferential surfaces of the teeth and the adjacent wall of the hopper base being parallel and inclined to the plane of rotation of the seed plate, whereby there is formed a circumferential series of individual seed cells having their side walls inclined to the plane of rotation of the seed plate, the upper ends of the said teeth extending to a point above the plane of the hopper bottom whereby they will act as agitators for the superincumbent mass of corn in the hopper, substantially as set forth.

2. In a planter, the combination of a hopper bottom, a seed plate having a circumferential series of radially inward and diagonally downward extending individual seed cells, seed agitators extending from the seed plate beyond the mouths of the cells, and a cut-off adapted to coöperate with the seed plate, substantially as set forth.

3. In a planter, the combination of a hopper bottom, having a depression with an inwardly inclined annular surface, a rotary seed plate having inclined teeth parallel to and adjacent the inclined surface of the depression in the hopper bottom, and a stationary cup plate above the seed plate and forming top walls for the seed cells formed between the seed plate teeth, the said teeth extending outward and upward to a point above the plane of the hopper bottom, substantially as set forth.

4. In a planter, the combination of a hopper bottom having a depression with an inward inclined annular surface, a rotary seed plate having inclined teeth parallel to and adjacent the inclined surface of the depression in the hopper bottom, a stationary cap plate above the seed plate and forming top walls for the seed cells formed between the seed plate teeth, the said teeth extending outward and upward to a point above the plane of the hopper bottom, and stationary teeth having beveled edges mounted on the hopper bottom outside of the seed plate teeth and adapted to coöperate with them, substantially as set forth.

5. In a planter, a seed separating mechanism comprising a hopper, a series of inward extending stationary teeth having non-radial edges arranged circumferentially about the hopper bottom, and a rotary seed plate having individual seed cells located below the plane of the hopper bottom, the seed plate being provided with upstanding teeth adapted to agitate the superincumbent mass of seeds in the hopper, and to coöperate with the stationary teeth to direct seeds into the seed cells, substantially as set forth.

6. In a planter, a seed separating mechanism comprising a hopper, a hopper base, a seed supporting plate in the bottom of the hopper, the said hopper base and seed supporting plate having circumferentially arranged parallel surfaces each of which is downward inclined radially, a seed plate mounted for rotation beneath the said seed supporting plate and provided with outward and upward inclined spaced teeth adapted to extend between the two said inclined parallel surfaces to form seed cells between the said surfaces and between each pair of adjacent teeth, the cells communicating with the hopper, and a downward extending duct arranged to receive seeds from the said cells as the seed plate is rotated.

In testimony whereof I affix my signature, in presence of two witnesses.

HARRY L. DOOLEY.

Witnesses:
OSCAR F. LUNDAHL,
ROBERT M. ADAMS.

Copies of this patent may be obtained for five cents each, by addressing the "Commissioner of Patents, Washington, D. C."